(12) United States Patent
Cho et al.

(10) Patent No.: US 9,164,682 B2
(45) Date of Patent: Oct. 20, 2015

(54) NONVOLATILE STORAGE DEVICE AND OPERATING SYSTEM (OS) IMAGE PROGRAM METHOD THEREOF

(71) Applicant: Samsung Electronics Co., Ltd., Suwon-Si, Gyeonggi-Do (KR)

(72) Inventors: Sung-Hyun Cho, Suwon-si (KR); Dongin Kim, Suwon-si (KR); Junseok Park, Seoul (KR); Taemin Lee, Hwaseong-si (KR); Chaesuk Lim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/579,810

(22) Filed: Dec. 22, 2014

(65) Prior Publication Data

US 2015/0106559 A1 Apr. 16, 2015

Related U.S. Application Data

(63) Continuation of application No. 14/197,425, filed on Mar. 5, 2014, now Pat. No. 8,938,581.

(30) Foreign Application Priority Data

Mar. 15, 2013 (KR) .................. 10-2013-0028116

(51) Int. Cl.
*G06F 12/02* (2006.01)
*G06F 3/06* (2006.01)
(Continued)

(52) U.S. Cl.
CPC ............ *G06F 3/0617* (2013.01); *G06F 3/0619* (2013.01); *G06F 3/0647* (2013.01);
(Continued)

(58) Field of Classification Search
CPC . G06F 12/0246; G06F 3/0619; G06F 3/0647; G06F 3/0679; G06F 11/1008
USPC ........... 711/103, 112, 165, 154, 162, E12.008
See application file for complete search history.

(56) References Cited

U.S. PATENT DOCUMENTS 6,272,388 B1    8/2001  Buvel et al.
7,055,059 B2 *  5/2006  Yanai et al. .................. 714/6.32
(Continued)

FOREIGN PATENT DOCUMENTS

JP    H10-340189 A    12/1998
JP    2010-055527 A    3/2010
(Continued)

*Primary Examiner* — Pierre-Michel Bataille
(74) *Attorney, Agent, or Firm* — Harness, Dickey & Pierce

(57) ABSTRACT

A nonvolatile storage device in accordance with the inventive concepts includes a nonvolatile memory device comprising a first memory area, a second memory area, and a memory controller. The memory controller includes a first register configured to store reliable mode information, and a second register configured to store operating system (OS) image information. The memory controller is configured to receive a command from a host based on the reliable mode information; determine whether the command is a write request for an OS image and whether OS image information accompanying the command matches the OS image information stored in the second register; write the OS image to the first memory area if the OS image information accompanying the command matches the OS image information stored in the second register, and block data migration of the OS image from the first memory area to the second memory area.

9 Claims, 14 Drawing Sheets

(51) Int. Cl.
*G06F 9/445* (2006.01)
*G06F 11/10* (2006.01)

(52) U.S. Cl.
CPC ............... *G06F 3/0679* (2013.01); *G06F 8/63* (2013.01); *G06F 12/0246* (2013.01); *G06F 3/0656* (2013.01); *G06F 3/0685* (2013.01); *G06F 11/1008* (2013.01)

(56) References Cited

U.S. PATENT DOCUMENTS

| | | | |
|---|---|---|---|
| 7,574,537 B2 * | 8/2009 | Arndt et al. | 711/165 |
| 7,711,917 B2 | 5/2010 | Yoshioka et al. | |
| 8,166,234 B2 | 4/2012 | Jang et al. | |
| 8,179,717 B2 | 5/2012 | Shepard et al. | |
| 8,254,170 B2 | 8/2012 | Eli et al. | |
| 8,429,334 B2 | 4/2013 | Ou | |
| 8,838,895 B2 * | 9/2014 | Yi et al. | 711/117 |
| 2010/0287424 A1 | 11/2010 | Kwon | |
| 2011/0107049 A1 | 5/2011 | Kwon et al. | |
| 2011/0199823 A1 | 8/2011 | Bar-or et al. | |
| 2011/0270945 A1 * | 11/2011 | Shiga et al. | 709/213 |
| 2012/0166706 A1 | 6/2012 | Pua et al. | |
| 2013/0046920 A1 * | 2/2013 | Ryu et al. | 711/103 |
| 2013/0227199 A1 | 8/2013 | Liu et al. | |
| 2013/0238833 A1 * | 9/2013 | Vogan et al. | 711/103 |
| 2013/0268739 A1 * | 10/2013 | Gupta et al. | 711/162 |
| 2014/0006740 A1 * | 1/2014 | Tokusho et al. | 711/165 |
| 2014/0059277 A1 | 2/2014 | Chung | |

FOREIGN PATENT DOCUMENTS

| | | |
|---|---|---|
| JP | 2010-225200 A | 10/2010 |
| KR | 2008-0085563 | 9/2008 |
| KR | 2012-0017790 | 2/2012 |

* cited by examiner

Fig. 2

Register 1

| Bit 7 | Bit 6 | Bit 5 | Bit 4 | Bit 3 | Bit 2 | Bit 1 | Bit 0 |
|---|---|---|---|---|---|---|---|
| Vendor_Features_Support ||||||||

* Bit [1]= 0x1 : Device support vendor features for writing OS image
  Bit [1]= 0x0 : Device does not support vendor features for writing OS image

Fig. 3

Register 2(Read/Write)-OS image information

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Start sector address ||||||||
| 1 | Sector count ||||||||
| 2 | Attribute 1 ||||||||
| 3 | Attribute 2 ||||||||

Fig. 4

Register 3(Read/Write)

| Bit 7 | Bit 6 | Bit 5 | Bit 4 | Bit 3 | Bit 2 | Bit 1 | Bit 0 |
|---|---|---|---|---|---|---|---|
| OS_IMG_ WR_DIS | Reserved | | | | | OS_IMG_ WR_ST | OS_IMG_ WR_EN |
| R/W | | | | | | R | R/W |

* Bit [0]= 0x0 : Obsolete
* Bit [0]= 0x1 : Enable the mode for OS image writing

* Bit [1]= 0x0 : State of not assuring reliable data for OS image
* Bit [1]= 0x1 : State of assuring reliable data for OS image

* Bit [7]= 0x0 : Obsolete
* Bit [7]= 0x1 : Permanently disable the mode for OS image writing

Fig. 9

SMT Mode Set Register (Rread/Write)

| Bit 7 | Bit 6 | Bit 5 | Bit 4 | Bit 3 | Bit 2 | Bit 1 | Bit 0 |
|---|---|---|---|---|---|---|---|
| DIS_SMT_MODE _CONFIG | | | Reserved | | | | EN_SMT_MODE CONFIG |
| R/W | | | | | | | R/W |

* Bit [7:0]= 0x00 : Default (Before SMT)
* Bit [7:0]= 0x01 : SMT mode Start (to enable gang write)
* Bit [7:0]= 0x81 : SMT mode End (to disable gang write)

NONVOLATILE STORAGE DEVICE AND OPERATING SYSTEM (OS) IMAGE PROGRAM METHOD THEREOF

CROSS-REFERENCE TO RELATED APPLICATIONS

This application is a continuation application of U.S. application Ser. No. 14/197,425, filed Mar. 5, 2014, which claims priority under 35 U.S.C. §119 of Korean Patent Application No. 10-2013-0028116, filed on Mar. 15, 2013, the entire contents of each of which are hereby incorporated by reference.

BACKGROUND OF THE INVENTION

The inventive concepts herein relate to semiconductor memory devices, and more particularly, to nonvolatile storage devices that can increase data reliability and an operating system (OS) image program method thereof.

Semiconductor memory devices can be classified into volatile semiconductor memory devices and/or nonvolatile semiconductor memory devices. The volatile semiconductor memory devices have a high read/write speed but lose their stored data when their power supplies are interrupted. The nonvolatile semiconductor memory devices retain their stored data even when their power supplies are interrupted. Thus, the nonvolatile semiconductor memory devices are used to store data which has to be preserved regardless of whether their power supplies are interrupted.

A typical example of a nonvolatile semiconductor memory device is a flash memory device. A flash memory device is being widely used as a storage medium of voice and image data of information devices such as a computer, a cellular phone, a personal digital assistant (PDA), a digital camera, a camcorder, a voice recorder, a MP3 player, a personal hand-held terminal, a hand-held PC, a game machine, a fax scanner, a printer, and/or other like devices. Such devices may be referred to as a 'host'.

Recently, a NAND flash-based embedded multimedia card (eMMC) is becoming common as a storage medium of a mobile device. A storage medium of a mobile device stores an operating system (OS) image of a mobile device. An eMMC is mounted on a printed circuit board of a mobile device. Thus, an OS image may be stored in an eMMC before the eMMC is mounted on a printed circuit board of a mobile device. In a process of mounting an eMMC on a printed circuit board of a mobile device, a surface mount technology (SMT) or an infrared reflow may be used. Due to that process described above, reliability of an OS image stored in an eMMC may be degraded.

SUMMARY

Embodiments of the inventive concepts provide a nonvolatile storage device. The nonvolatile storage device may include a nonvolatile memory device comprising a first memory area and a second memory area, and a memory controller. Each of the memory area including a plurality of memory cells, each memory cell being able to operate one of high data reliability mode and low data reliability mode in response to an operating condition, the first memory area operating in the high data reliability mode and the second memory area operating in the low data reliability mode. The memory controller may include a first register configured to store reliable mode information, and a second register configured to store operating system (OS) image information. The reliable mode information may indicate whether a reliable mode is active or not. The memory controller is configured to receive a write command from a host; determine whether OS image information accompanying the command matches the OS image information stored in the second register; write the OS image to the first memory area if the OS image information accompanying the command matches the OS image information stored in the second register, and block data migration of the OS image from the first memory area to the second memory area if the reliable mode information indicates the reliable mode is active.

Embodiments of the inventive concepts also provide a method of programming an operating system (OS) image in a memory card, where the memory card includes a first register and a second register. The method may include determining whether to support a reliable write mode for the OS image with reference to a set value in the first register, writing OS image information to the second register, the OS image information including at least one of a sector start address, a sector counter, and an attribute of the OS image, and programming the OS image in the memory card. The reliable mode information may indicate a level of reliability of storing data in at least one region of the memory card and may indicate an error rate threshold of the OS image information. The reliable mode may be in one of an active state or an inactive state. The programming may include writing the operation system image in a nonvolatile memory device according to the reliable mode. The reliable mode may indicate an error rate threshold of the OS image information.

Embodiments of the inventive concepts provide a method of programming an operating system image of an embedded multimedia card. The method may include checking whether operating system (OS) image information exists; determining whether a write request of the operating system image matches the OS image information; and programming the write request OS image in a nonvolatile memory device based on the determining and reliable mode information, the reliable mode information may indicate that a reliable mode is in one of an active state and an inactive state. The reliable mode may indicate a level of reliability of storing data in at least one region of the memory card and may indicate an error rate threshold of the OS image information.

Example embodiments provide An operating system (OS) image writing system including a host and a memory card. The memory card including a nonvolatile memory device and a memory controller. The memory controller includes a mode set register configured to store mode information. The mode information may indicate that a reliable mode is in one of an active state and an inactive state. The reliable mode may indicate a level of reliability for storing data in at least one of the first memory area and the second memory area. The memory controller is configured to receive a request and OS image information from the host, determine a request type of the received request, and perform an OS image write operation if the request type is a write request and the mode information indicates a reliable mode. The OS image write operation includes writing the OS image in the nonvolatile memory device.

BRIEF DESCRIPTION OF THE FIGURES

Preferred embodiments of the inventive concepts will be described below in more detail with reference to the accompanying drawings. The embodiments of the inventive concepts may, however, be embodied in different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

FIGS. 2 through 4 are tables illustrating a field value of a register of FIG. 1.

FIG. 9 is a table illustrating a field value of a SMT mode set register illustrated in FIG. 8.

DETAILED DESCRIPTION OF PREFERRED EMBODIMENTS

Figure 1:
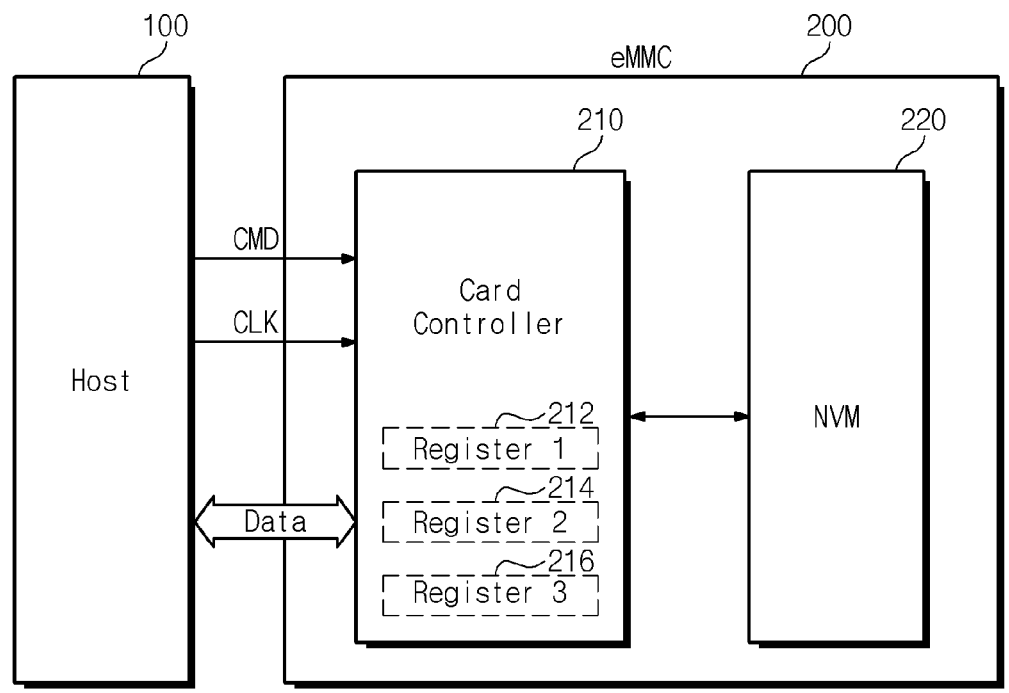
FIG. 1 is a block diagram illustrating a memory system in accordance with an example embodiment of the inventive concepts.

Embodiments of inventive concepts will be described more fully hereinafter with reference to the accompanying drawings, in which embodiments of the invention are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings as disclosed herein.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, features and functions of the inventive concepts will be exemplarily described using a flash memory device as a nonvolatile storage medium. However, the inventive concepts is not limited thereto. For example, the storage medium may be formed of a PRAM, an MRAM, a ReRAM, a FRAM, a NOR flash memory, or the like.

The example embodiments may be implemented by different embodiments or applied thereto. Further, detailed description may be modified or changed according to viewpoints and applications without escaping from the scope, spirit and other objects of the inventive concepts. Below, the example embodiments will be described with reference to accompanying drawings.

FIG. 1 is a block diagram illustrating a memory system in accordance with an example embodiment of the inventive concepts. Referring to FIG. 1, a memory system includes a host 100 and a memory card 200. The host 100 can program an OS image before the memory card 200 is mounted on a target board. The host 100 can set the memory card 200 so that the memory card 200 recognizes an OS image to process the OS image according to a reliable mode. In various embodiments, the reliable mode may be in an active state or an inactive state. An OS image may be a copy of an operating system and/or an already-assembled operating system that can be stored in a nonvolatile form and loaded and/or restored on a computing device like a host 100 in the same state as when it was copied and/or assembled. Accordingly, an OS image may include any necessary and/or desired drivers, applications, and/or other like system requirements for a particular computing system.

The host 100 writes data in the memory card 200 or reads data stored in the memory card 200. The host 100 transmits a command CMD, a clock signal CLK generated from a clock generator in the host 100 and data to the memory card 200. The host 100 may be an equipment to test the memory card 200 in a state that a manufacture of the memory card 200 is completed. The host 100 may be a gang equipment including a plurality of sockets adopting memory cards to write an OS image before the memory card 200 is mounted on a mobile device. A gang equipment may be a computing system configured to schedule multiple threads or processes to run simultaneously on different processors. The host 100 may be a mobile device on which the memory card 200 is mounted by a surface mount technology (SMT). Hereinafter, it is assumed that the host 100 is a gang equipment to record an OS image in the memory card 200.

The memory card 200 includes a card controller 210 and a nonvolatile memory device 220. An embedded multimedia card (eMMC) embedded in a target board exemplified as the memory card 200 of the inventive concepts. However, the memory card 200 of the inventive concepts is not limited to the embedded multimedia card (eMMC) and may include other flash memory data storage devices.

The card controller 210 receives a command CMD, a clock signal CLK and data from the host 100. When a write operation is performed, the card controller 210 can receive a write command and write data synchronized with the clock signal from the host 100. The card controller 210 stores the write data being provided in a target region of the nonvolatile memory device 220.

The card controller 210 includes at least three registers 212, 214 and 216 to manage an OS image in accordance with some exemplary embodiments. The first register 212, when OS image information is provided from the host 100, represents whether a write function by a reliable mode for the OS image can be performed. The second register 214 stores OS image information being provided from the host 100. The third register 216 sets up whether a write operation of an OS image by a reliable mode begins or not.

It is assumed that a value set up in the first register 212 is such that an OS image by a guarantee mode can be written. The host 100 provides a specific command (e.g., CMD8) to the memory card 200 to read the value set up in the first register 212. The card controller 210 provides setting bits of the first register 212 to the host 100 and the host 100 can check attribute with reference to the provided bit values. The host 100 checks that an OS image can be written by a reliable mode for the memory card 200 and the host 100 writes the OS image information in the second register 214. The OS image information may include various attributes such as an OS image size, address information, and the like. If a write operation with respect to the second register 214 is finished, the host 100 activates a start bit of the third register 216. And then, the card controller 210 begins an OS image write operation of the inventive concepts.

The nonvolatile memory device 220 may include a plurality of nonvolatile memory chips. The nonvolatile memory device 220 may include a first memory region being configured to store a small number of bits of data being stored per cell and a second memory region being configured to store bits of data being stored per cell larger than the number of bits of data being stored per cell in the first memory region. Data stored in the first memory region can maintain high data reliability regardless of an environmental change or a physical interference. The first memory region can be managed by a single level cell (SLC) storing 1 bit data in one memory cell. The second memory region can be managed by a multi-level cell (MLC) storing two (2) or three (3) bit data in one memory cell. However, two (2) or more bit data may be stored in the first memory region. The number of bits per cell of data being stored in the first memory region may be smaller than that of the second memory region. Memory cells included in the nonvolatile memory device 220 are configured to operate as one of data reliable modes including SLC and MLC by program command from the controller.

A speed of a write operation being performed on the first memory region is relatively higher than that of the second memory region. Data stored in the first memory region has relatively higher reliability as compared with that of the second memory region. Thus, the first memory region may be used as a buffer temporarily storing data being input. The second memory region has high integration of data but has relatively low data reliability. Thus, the nonvolatile memory device 220 temporarily stores data being input in the first memory region, and then transfers the stored data to the second memory region at specific or otherwise desired point of time.

A reliable mode being activated when an OS image writing operation is performed can be performed such that the memory card 200 recognizes an OS image to store the OS image in only the first memory region and blocks OS image movement to the second memory region. However, the reliable mode for the OS image is not limited thereto but various types of operations of increasing reliability of the OS image can be applied.

FIG. 2 is a table illustrating a bit value of the first register of FIG. 1. Referring to FIG. 2, the first register 212 stores a setting value supporting a vendor specific feature.

Various characteristic values can be stored in data of one (1) byte being stored in the first register 212 in response to a vender's desire. The first register 212 may store information about whether the memory card 200 supports an OS image write operation of the inventive concepts. For example, information about whether the memory card 200 supports an OS image write operation of the inventive concepts may be stored in a second bit (bit 1) among one (1) byte. If a setting value of the second bit read by the host 100 is logic '0', the host judges or otherwise determines that the memory card 200 does not support an OS image write operation of the inventive concepts. If a setting value of the second bit read by the host 100 is logic '1', the host judges or otherwise determines that the memory card 200 supports an OS image write operation of the inventive concepts.

The host 100 provides a command for reading a setting value of a card specific data (CSD) register to check whether the memory card 200 supports the OS image write operation. The host 100 checks a logical value of the second bit (bit 1) stored in the first register 212 by a request for reading the card specific data (CSD) register. The host 100 writes the OS image information in the second register 214 depending on whether the memory card 200 supports the OS image write operation of the inventive concepts.

FIG. 3 is a table illustrating a bit value of the second register of FIG. 1. Referring to FIG. 3, the second register 214 stores OS image information to be used in the memory card 200 supporting an OS image write operation.

The second register 214 stores OS image information understood by the host 100. The OS image information understood by the host 100 corresponds to OS image information of before the memory card 200 is built in a mobile device using a surface mount technology (SMT). That is, the OS image information may include size information of an OS image being stored in the memory card 200 before applying a surface mount technology (SMT). The OS image information may include a start sector address in which the OS image is stored. The OS image information may include a sector counter corresponding to a size of the OS image. The OS image information may include various file attributes (e.g., atrribute1 and attribute2) of the write requested OS image from the host 100.

If the OS image information is stored in the second register 214, the memory card 200 recognizes that the write requested data from the host 100 is an OS image. The memory card 200 performs a write operation for guaranteeing data reliability even in a SMT operation or an infrared reflow (IR) process with respect to the OS image.

As described above, a size of the second register 214 is four (4) bytes, but the inventive concepts are not limited thereto. A register of any size that can sufficiently accommodate OS image information may be provided.

FIG. 4 is a table illustrating a bit value of the third register of FIG. 1. Referring to FIG. 4, the third register 216 stores a setting value activating a reliable mode for an OS image of the memory card 200 after OS image information is completely set up. The third register 216 is constituted by one (1) byte, and whether or not to activate a reliable mode for an OS image and a state of a reliable mode for an OS image can be set up in a LSB (bit 0), a bit (bit 1) and a MSB (bit 7). It is assumed that each of the LSB (bit 0), the bit (bit 1) and the MSB (bit 7) is set to have a default value of logic '0'.

The LSB (bit 0) of the third register 216 stores whether or not to activate a reliable mode for an OS image. The host 100 can switch the LSB (bit 0) of the third register 216 into logic '1' after writing OS image information in the second register 214. At this time, the host 100 can use a switching command to write the LSB (bit 0) of the third register 216 as logic '1'. After that, the memory card 200 judges or otherwise determines whether performing a reliable mode for an OS image being input with reference to the LSB (bit 0) of the third register 216.

The MSB (bit 7) of the third register 216 stores whether or not to deactivate a reliable mode for an OS image. The host 100 can switch the MSB (bit 7) of the third register 216 into logic '1' after finishing a program of an OS image by a reliable mode. The host 100 can switch the MSB (bit 7) of the third register 216 into logic '1' after a SMT operation or an infrared reflow process is completed. At this time, the host 100 can use a switching command to write the MSB (bit 7) of the third register 216 as logic '1'. With reference to a logic value of the MSB (bit 7) of the third register 216, the memory card 200 can determine whether or not to deactivate a reliable mode for a write requested OS image. If it is checked that the logic value of the MSB (bit 7) of the third register 216 is logic '0', the memory card 200 will not apply a reliable mode to an OS image any more.

The bit (bit 1) of the third register 216 stores a current state of a reliable mode for an OS image, that is, activation or deactivation of the reliable mode. Logic '0' of the bit (bit 1) of the third register 216 can represent that a current reliable mode is in a deactivation state. Logic '1' of the bit (bit 1) of the third register 216 can represent that a current reliable mode is in an activation state.

After a program of an OS image by a reliable mode is completed, the host 100 can check a state of a current reliable mode for a logical value of the bit (bit 1) of the third register 216. Although a logical value of the LSB (bit 0) of the third register 216 is logic '1' and a logical value of the MSB (bit 7) of the third register 216 is logic '0', in the case that a reliable mode for an OS image is internally terminated in the memory card 200, the bit (bit 1) of the third register 216 can be stored as logic '0'. If the host 100 provides a specific command (e.g., CMD8) to read a value set in the third register 216 to the memory card 200, the card controller 210 provides setting bits of the third register 216 to the host 100. With reference to a logical value of the setting bits provided, the host 100 can check an attribute of the memory card 200. Accordingly, the host can judge or otherwise determine whether a reliable mode for a current OS image is activated in the memory card 200 and whether a reliable mode operation is automatically finished.

Figure 5A:
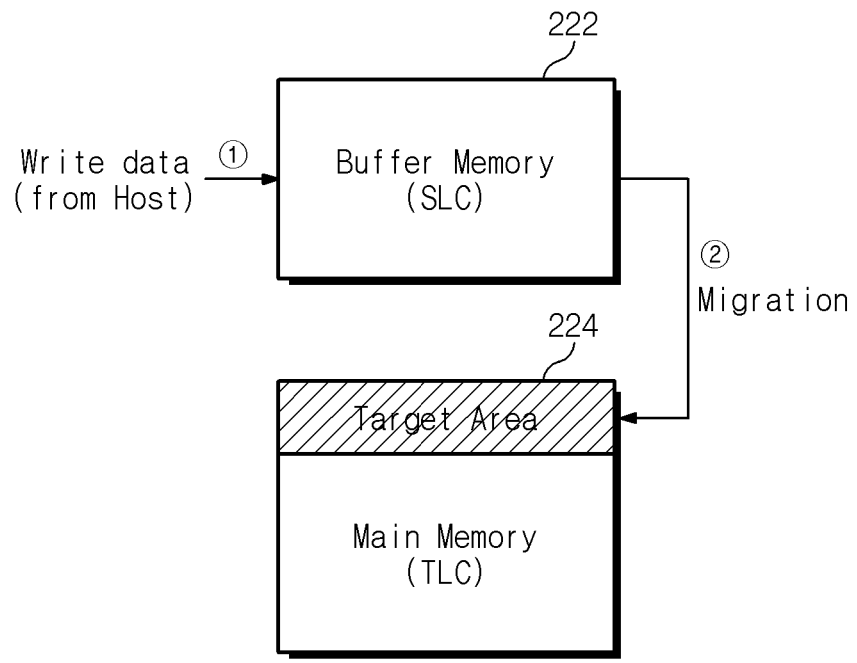
FIGS. 5A and 5B are block diagrams illustrating a write operation in accordance with a reliable mode according to an example embodiment of the inventive concepts.
Figure 5B:
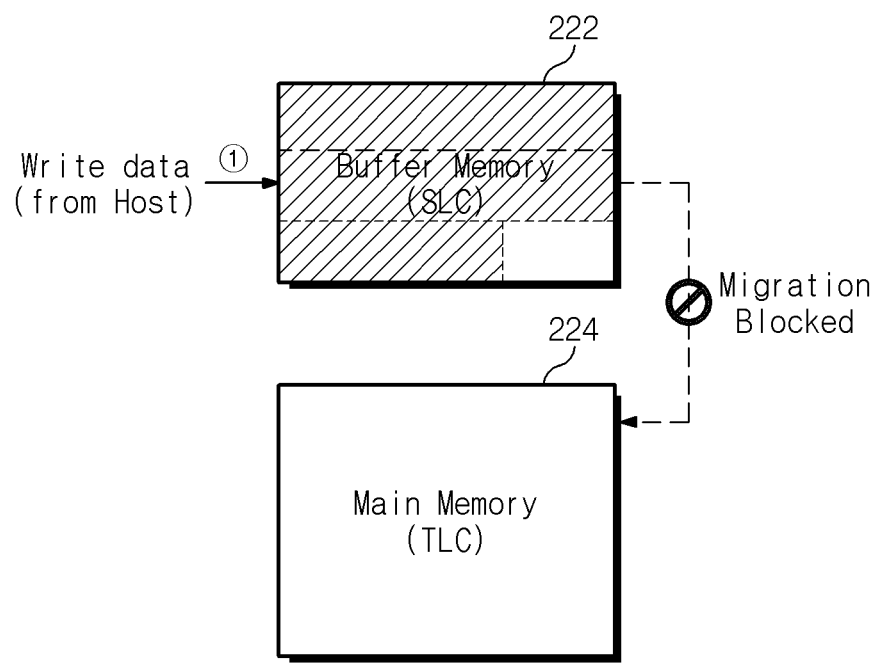

FIGS. 5A and 5B are block diagrams illustrating a write operation in accordance with a reliable mode according to an example embodiment of the inventive concepts. FIG. 5A illustrates a data write process into the nonvolatile memory device 220 when the reliable mode is deactivated and FIG. 5B illustrates a data write process into the nonvolatile memory device 220 when the reliable mode is activated.

The nonvolatile memory device 220 may include a buffer memory 222 and a main memory 224 to provide a reliable mode. For convenience of description, the buffer memory 222 is configured to operate as a single level cell (SLC), where one (1) bit is stored in one memory cell. The main memory 224 is configured to operate as a triple level cell (TLC) that 3 bits are stored in one memory cell. However, the buffer memory 222 and the main memory 224 are not limited to the single level cell (SLC) and/or the triple level cell (TLC), such that the number of storage bits per cell in the buffer memory 222 may be less than the number of storage bits per cell in the main memory 224.

The buffer memory 222 constituted by a single level cell SLC provides a relatively high write speed. Since a distribution of a threshold voltage to be distinguished by a read voltage is limited to two states in the single level cell (SLC), the buffer memory 222 has a large read margin. Thus, the buffer memory 222 can maintain high data reliability even when it is exposed to a process such as a surface mount technology (SMT) or an infrared reflow.

The main memory 224 constituted by a triple level cell (TLC) provides a relatively low write speed as compared with the buffer memory 222 constituted by a single level cell (SLC). Eight threshold voltage distributions may have to be accommodated within a limited voltage window in the triple level cell (TLC). The main memory 224 has a relatively small read margin and can be easily deteriorated by an external interference. Thus, if the main memory 224 is exposed to a high temperature such as a surface mount technology (SMT) or an infrared reflow, it may be difficult to guarantee reliability of data recorded in the main memory 224.

In a general write operation of the memory card 200, most of the data is programmed in the buffer memory 222 first. The data programmed in the buffer memory 222 is migrated to the main memory 224 at a specific point in time. A data migration from the buffer memory 222 to the main memory 224 can be performed by a background operation which is operated without intervention from the host. A data migration from the buffer memory 222 to the main memory 224 may be performed according to a size of a write enable space of the buffer memory 222. The buffer memory 222 and the main memory 224 can be provided by the separate memory chips.

That is, the nonvolatile memory device 220 can be constituted by at least one memory chip constituting the buffer memory 222 and at least one memory chip constituting the main memory 224. The nonvolatile memory device 220 can be constituted by one chip in which different types of memories like the buffer memory 222 and the main memory 224 are integrated.

Referring to FIG. 5A, a data migration is illustrated that is generated when a general write operation in which a reliable mode is not activated is performed. For example, the case that the LSB of the third register 216 is detected as logic '0'. If write data is provided from the host 100 first, the write data is programmed in the buffer memory 222 according to a control of the card controller 210 ①. Data stored in the buffer memory 222 by the card controller 210 will be migrated to a target area of the main memory at a specific point in time ②.

Referring to FIG. 5B, a data management method of a write operation in which a reliable mode is activated is illustrated. If write data is provided from the host 100 first, the write data is programmed in the buffer memory 222 according to a control of the card controller 210 ①. However, in the case that a reliable mode is activated with respect to the write requested data, a migration of data stored in the buffer memory 222 to the main memory 224 is blocked out. For example, in the case that the LSB (bit 0) of the third register 216 is detected as logic '1', a migration of data stored in the buffer memory 222 to the main memory 224 is blocked out.

As an illustration of a reliable mode, a method was described which blocks out a migration of the write requested data from the buffer memory 222 constituted by a single level cell (SLC) to the main memory 224 constituted by a triple level cell (TLC). However, the inventive concepts are not limited thereto. Various types of reliable modes may be applied to a write operation of an OS image of the inventive concepts.

Figure 6:
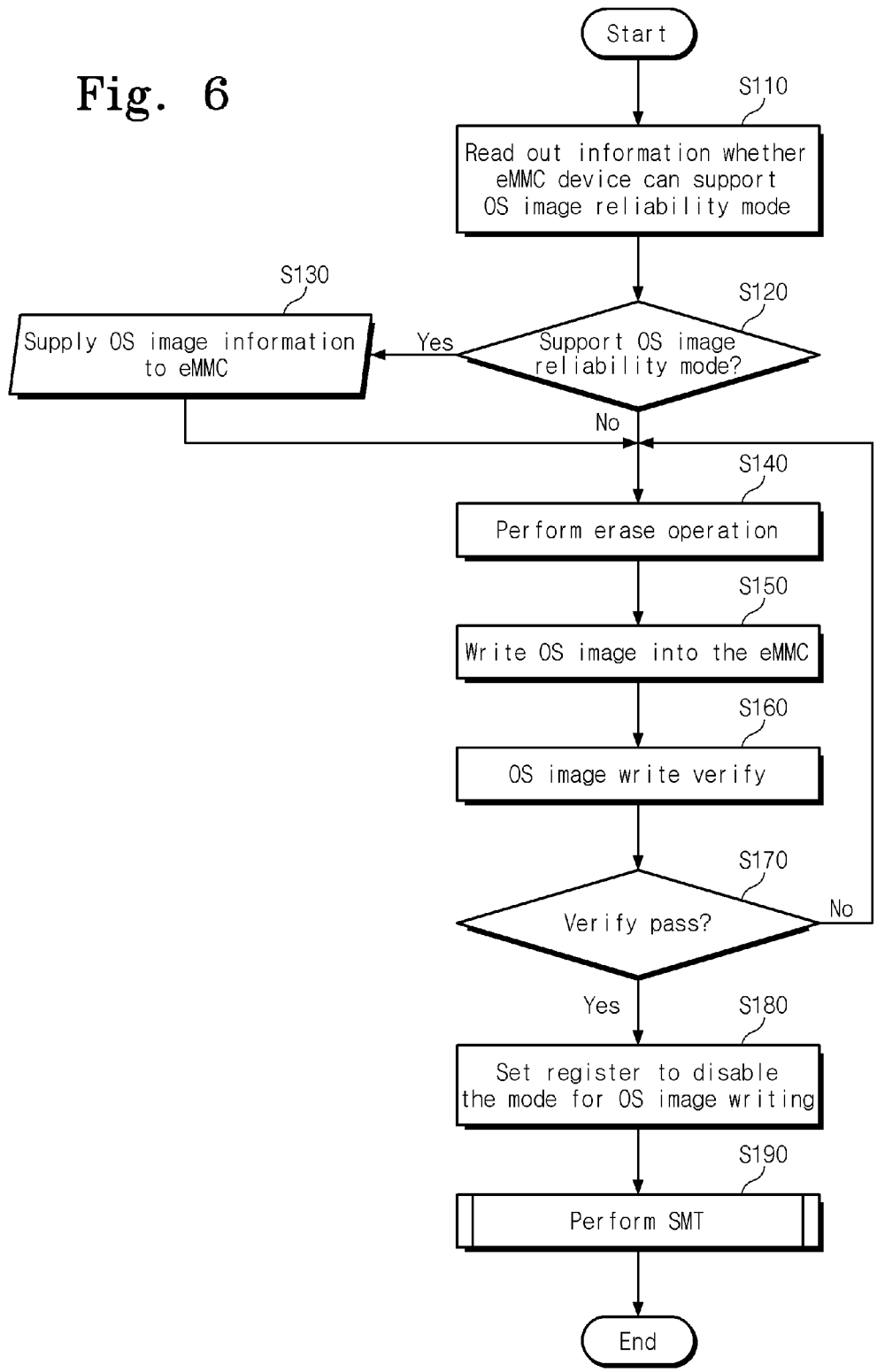
FIG. 6 is a flow chart illustrating an OS image write operation of a host in accordance with an example embodiment of the inventive concepts.

FIG. 6 is a flow chart illustrating an OS image write operation of a host in accordance with an example embodiment of the inventive concepts. Referring to FIG. 6, the host 100 programs an OS image in the memory card 200 before applying a surface mount technology (SMT). The host 100 may be a gang equipment for recording code data or an OS image in the memory card 200 before applying a surface mount technology (SMT). If the memory card 200 in which an OS image will be recorded is connected to the host 100, an OS image write operation starts.

In operation S110, the host 100 reads out information whether the memory card 200 can support an OS image write operation based on the reliability mode. In various embodiments, the reliable mode may indicate a level of reliability for storing data in at least one region and/or area of the memory card 200. Thus, the reliable mode may indicate whether a region of memory card 200 is reliable enough to support an OS image. If the memory card 200 is connected to the host 100, the host 100 can provide a command for reading a register in which a vendor specific feature is recorded. The host 100 provides a command for reading out a set value of the first register 212 to the memory card 200. The memory card 200 transmits data recorded in the first register 212 to the host 100. The host 100 judges whether the memory card 200 supports an OS image write operation of the inventive concepts with reference to the set value of the first register 212 being provided form the memory card 200. The OS image write operation means that the memory card 200 selectively applies recognition for an OS image being provided from the host 100 and a reliable mode for the OS image being provided from the host 100.

In operation S120, the host 100 judges or otherwise determines whether the memory card 200 supports an OS image reliability mode and/or write operation of the inventive concepts. The host 100 performs an operation divergence with reference to the set (bit 1) of the first register 212 being provided from the memory card 200. If the memory card 200 is detected to support an OS image write operation of the inventive concepts (Yes direction), the host 100 proceeds to an operation S130 to supply the OS image information to the memory card 200. If the memory card 200 is detected not to support an OS image write operation of the inventive concepts (No direction), the host 100 proceeds to operation S140 to perform an erase operation.

In operation S130, the host 100 inputs OS image information into the memory card 200. If a setting (bit 1) of the first register 212 is detected to correspond to logic '1', the host 100 records OS image information in the memory card 200 so that the memory card 200 recognizes an OS image being supplied. The host 100 records OS image information which the host 100 holds in the second register 214. The host 100 can store a start sector address for storing an OS image in the memory card 200. The host 100 can record a sector count corresponding to a size of an OS image in the second register 214. The host 100 can record file attributes (attribute 1, attribute 2) needed when the memory card 200 recognizes a write requested OS image in the second register 214. A procedure for recording OS image information may be performed through a plurality of switch commands.

If a record of OS image information is completed, the host 100 can activate a LSB of the third register 216 of the memory card 200 to logic '1'. If the LSB of the third register 216 is activated to logic '1', write requested data after that is recognized as an OS image and is processed according to the reliable mode of the inventive concepts.

In operation S140, the host 100 performs an erase operation on a memory area in which an OS image will be stored. In the case that the memory card 200 supports an OS image write operation of the inventive concepts, the host 100 can ask or otherwise request the controller 210 to erase only an area corresponding to OS image information. In the case that the memory card 200 does not support an OS image write operation of the inventive concepts, the host 100 can ask the controller 210 to erase the whole memory area to store an OS image or code data. Thus, sufficient capacity of the memory card 200 may be obtained by erasing a part of the OS image already recorded in case of a failure of an OS image write operation.

In operation S150, the host 100 provides a write command CMD and an OS image to the memory card 200. The host can write an OS image in the memory card 200 through a stream write or a block write.

In operation S160, the host 100 performs a verification operation on a written OS image. The host 100 judges or otherwise determines whether a write operation has succeed or failed through a verification operation being performed by a method of detecting an error with respect to an OS image written in specific area or other methods.

In operation S170, the host 100 determines if the verification operation on the written OS image has passed or succeeded. The host 100 performs an operation divergence according to a result of write verification on an OS image. If the verification result is detected to be a write success of an OS image recorded in the memory card 200 (Yes direction), the host 100 proceeds to operation S180 to set a register to disable or inactivate a reliable mode for the OS image write operation. If the verification result is detected to be a write fail of an OS image recorded in the memory card 200 (No direction), the host 100 returns to operation S140 to erase an existing recorded memory area and then to rerecord an OS image.

In operation S180, as an OS image write operation of the inventive concepts is completed, the host 100 sets a register to disable or inactivate a reliable mode for an OS image write operation being performed after that. For instance, the host 100 can switch a MSB of the third register 216 to logic '1'. Then when an OS image write operation is performed on the memory card 200, an application of a reliable mode is permanently cut off.

In operation S190, a surface mount technology (SMT) is applied to the memory card 200. The memory card 200 goes through a process being built in a main board of a mobile device to be mounted. At this time, an infrared reflow process can be applied. While the memory card 200 is built in a mobile device according to a surface mount technology (SMT), an OS image written by the reliable mode is prevented from being corrupted by the high temperature of the SMT.

The host 100 such as a gang equipment may have a plurality of slots to record an OS image in a plurality of embedded multimedia cards (eMMC) simultaneously according to a reliable mode of the inventive concepts. In this case, even after a surface mount technology (SMT) is applied, reliability of an OS image stored in an embedded multimedia card (eMMC) can be maintained.

Figure 7A:
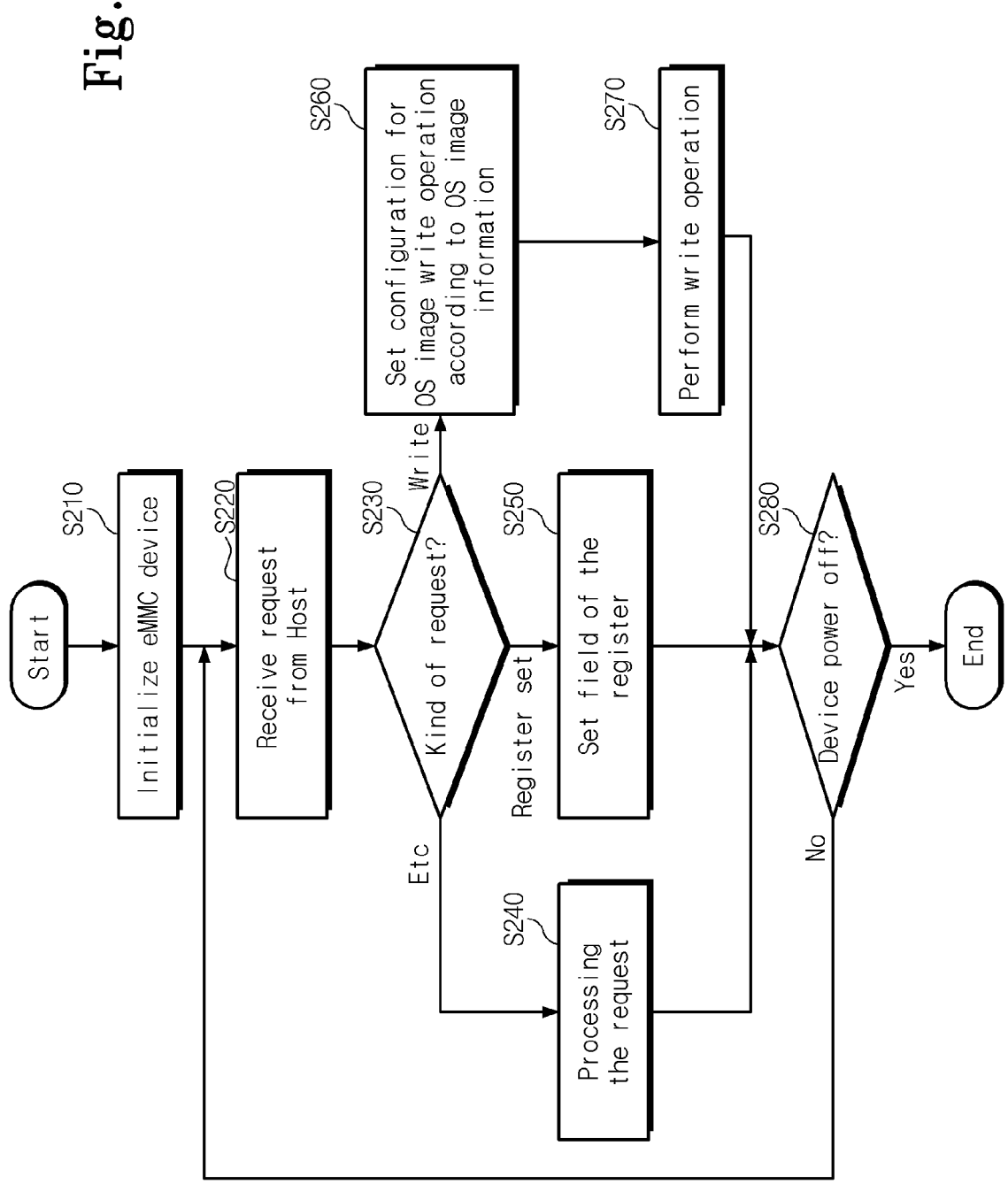
FIGS. 7A and 7B are flow charts illustrating an OS image write operation of a memory card in accordance with an example embodiment of the inventive concepts.
Figure 7B:
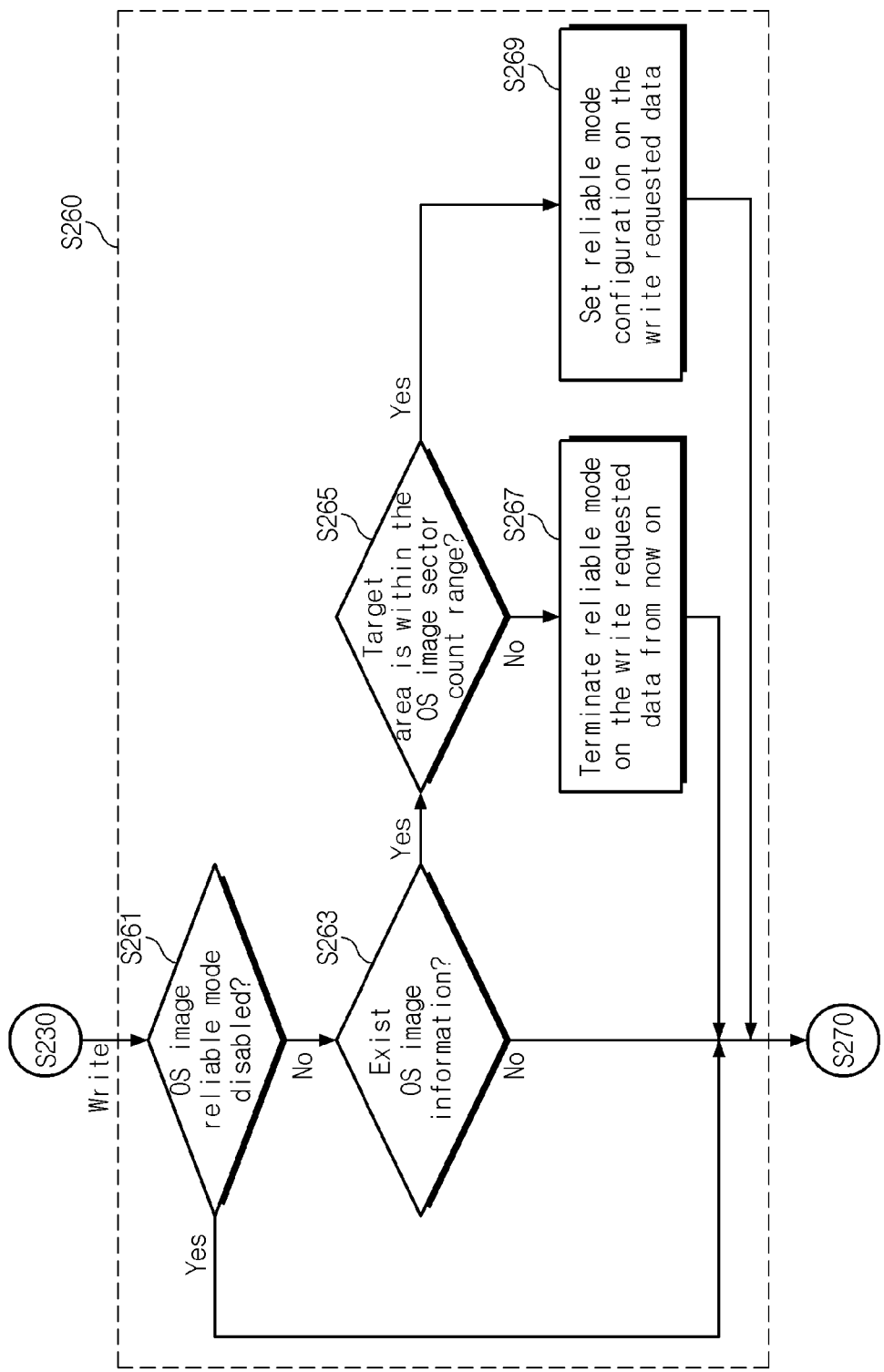

FIGS. 7A and 7B are flow charts illustrating an OS image write operation of a memory card in accordance with an example embodiment of the inventive concepts. The memory card 200 in which a record of OS image information is completed can perform an OS image write operation of the inventive concepts according to a write request from the host 100. After in input of OS image information is completed and a LSB of the third register 216 is activated to logic '1', an operation of the memory card 200 will be described with reference to FIGS. 7A and 7B. An operation divergence of the memory card 200 according to a request from the host 100 will be described with reference to FIG. 7A.

In operation S210, the memory card 200 performs an initialization operation. Through an initialization operation, the memory card 200 initializes an internal environment for an OS image write, code data or a register setting operation.

In operation S220, the memory card 200 receives requests being provided from the host 100. The requests being provided from the host 100 do not need to be limited to an OS image write operations. The memory card 200 may be able to treat various access requests.

In operation S230, the memory card 200 determines the types of request being provided from the host 100. If a request being transmitted from the host 100 is not a write request or a register set request (Etc direction), the memory card 200 proceeds to operation S240 to process the request. If a request being transmitted from the host 100 is a register set request (Register set direction), the memory card 200 proceeds to operation S250 to set a field of the register. If a request being transmitted from the host 100 is a write request (Write direction), the memory card 200 proceeds to operation S260 to set a configuration for an OS image write operation according to the OS information.

In operation S240, the memory card 200 performs an operation requested from the host 100. In some embodiments, other requests that do not include an OS image may be provided from the host 100. Once the memory card 200 performs the operation requested from the host 100, the memory card 200 proceeds to operation S280 to determine if the device power is off.

In operation S250, the memory card 200 performs a register setting operation requested from the host 100. In the case that various switching commands are provided, the memory card 200 records a setting value being requested from the host 100 in a corresponding register field. In this case, even if a request is related to an OS image write, the memory card 200 performs a register setting operation within a range requested from the host 100. In various embodiments, the memory card 200 may passively perform the register setting operation within the range requested from the host 100. Once the memory card 200 performs the register setting operation requested from the host 100, the memory card 200 proceeds to operation S280 to determine if the device power is off.

In operation S260, an OS image write operation is performed according to some exemplary embodiments of the inventive concepts. The memory card 200 detects whether OS image information and an OS image write operation are activated or not. The memory card 200 can determine an OS image write mode without intervention with reference to the detected data. The memory card 200 can activate or deactivate a reliable mode for write requested data with reference to the second register 214 and the third register 216.

In operation S270, the memory card 200 writes a write requested OS image in the nonvolatile memory device 220 according to a selected mode. If an OS image writing operation is performed according to a reliable mode, the memory card 200 cuts off a migration of write requested data from the buffer memory 222 to the main memory 224. However, if an OS image writing operation is judged or otherwise determined not to be a reliable mode, the memory card 200 moves write requested data from the buffer memory 222 to the main memory 224 at a specific time. Once the memory card 200 performs the write requested OS image in the nonvolatile memory device 220 according to a selected mode, the memory card 200 proceeds to operation S280 to determine if the device power is off.

In operation S280, the memory card 200 proceeds to operation S280 to determine if the device power is off. In the case that an external command or an internal operation state is an end mode or a supply cut off state (Yes direction), the memory card 200 stops all operations. However, in the case that an external command or an internal operation state is not an end mode (No direction), the memory card 200 returns to operation S220 for monitoring a request being provided from the host 100.

The memory card 200 can determine a reliable mode or a reliability unguaranteed mode without intervention of the host 100 when an OS image write operation is performed. The function makes the memory card 200 guarantees for reliability of an OS image before applying a surface mount technology (SMT). After applying a surface mount technology (SMT), a reliable mode for an OS image stored in the memory card 200 is set to be terminated without an external device.

FIG. 7B is a flow chart illustrating the operation S260 of FIG. 7A more concretely. Referring to FIG. 7B, an OS image write operation is described in accordance with some exemplary embodiments of the inventive concepts. When a write request occurs in operation S230, all procedures of the operation S260 for a write operation start.

In operation S261, the memory card 200 determines if an OS image reliability mode is disabled or inactive. In various embodiments, the memory card 200 is configured to detect reliability setting information about an OS image. The memory card 200 detects a logical value of MSB of the third register to check whether a reliable mode for write requested data is deactivated. If a logical value of MSB of the third register 216 is switched into logic '1', a reliable mode for an OS image is terminated. If the reliable mode of the OS image is inactive, terminated, or disabled (Yes direction), the memory card 200 proceeds to operation S270 to write data requested by a general mode which is not a reliable mode, as discussed above with respect to FIG. 7A. If a MSB of the third register 216 retains logic '0' and a LSB of the third register 216 retains logic '1', a reliable mode for an OS image may be judged or otherwise determined to be in an activated state. If the reliable mode of the OS image is active or enabled (No direction), the memory card 200 proceeds to operation S263 to check or otherwise determine whether OS image information exists or not.

In operation S263, the memory card 200 checks whether OS image information provided from the host 100 exists. Whether the OS image information exists can be judged or otherwise determined with reference to a set of the second register 214 of FIG. 3. However, whether the OS image information is input can be judged or otherwise determined by checking a logical value of the third register 216 as shown in FIG. 4. If the OS image information is detected to exist (Yes direction), the memory card 200 proceeds to operation S265 to determine if a target area is within the OS image sector count range. If the OS image information is detected or otherwise determined not to exist (No direction), the memory card 200 proceeds to operation S270 to perform the write operation.

In operation S265, is the memory card 200 detects or determines whether a target area in which a write requested OS image is stored coincides and/or matches with OS image information already stored. In various embodiments, the memory card 200 detects whether an address being provided when a write request occurs is within a range of a sector counter of the second register 214 input by the host 100 or not. If a target address of write requested data does not coincide and/or match with sector information of the OS image information (No direction), the memory card 200 proceeds to an operation S267 to terminate the reliable mode. If a target address of write requested data coincides with sector information of the OS image information (Yes direction), the memory card 200 proceeds to an operation S269 to set the reliable mode.

In operation S267, the memory card 200 terminates a reliable mode for the write requested data. A bit (bit 1) of the third register 216 showing a state of a reliable mode for a write requested OS image is set to logic '0' and a reliable mode for the corresponding data is terminated from now on. The MSB (bit 7) and the LSB (bit 0) of the third register 216 maintain the existing logical values.

In operation S269, the memory card 200 sets a reliable mode for a write requested OS image. If the memory card 200 sets a bit (bit 1) of the third register 216 to a logical '1', a reliable mode for the corresponding data is activated from now on. The MSB (bit 7) and the LSB (bit 0) of the third register 216 maintain the existing logical values.

Figure 8:
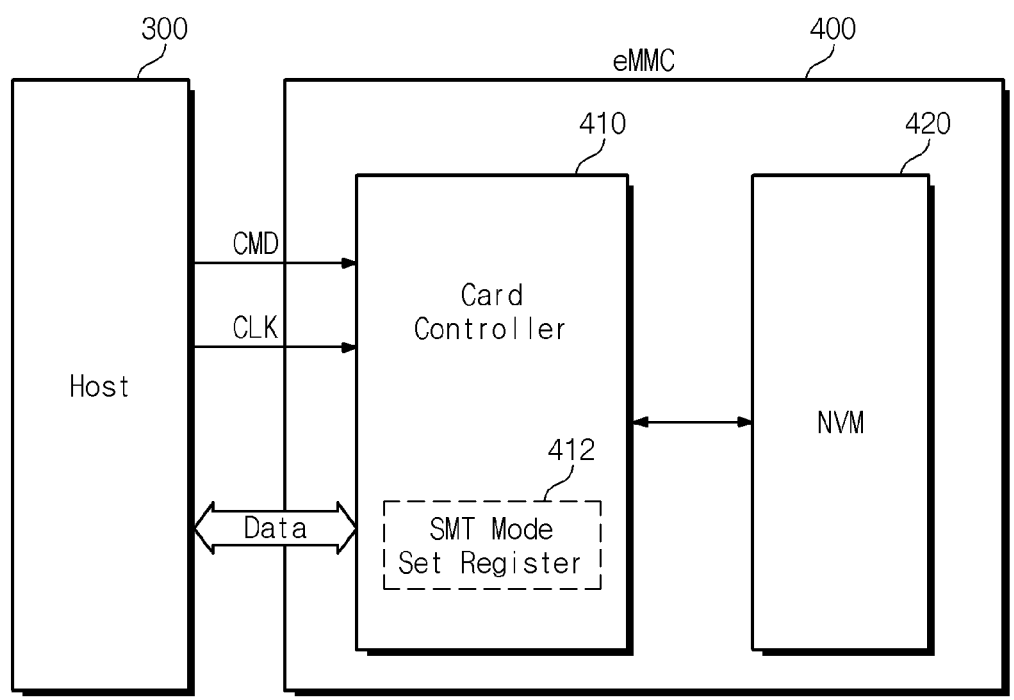
FIG. 8 is a block diagram illustrating a memory system in accordance with an example embodiment of the inventive concepts.

FIG. 8 is a block diagram illustrating a memory system in accordance with an example embodiment of the inventive concepts. Referring to FIG. 8, a memory system includes a host 300 and a memory card 400. The host 300 can write an OS image before applying a surface mount technology (SMT) of the memory card 400. After applying a surface mount technology (SMT), the host 300 can set a register of the memory card 400 so that a reliable mode for an OS image is deactivated.

The host 300 writes data in the memory card 400 or reads data stored in the memory card 400. The host 300 can transmit a command CMD, a clock signal CLK, and data to the memory card 400. The host 300 may include an equipment to test the memory card 200 in a state that manufacture of the memory card 400 is completed. The host 300 may be a gang equipment including a plurality of sockets to write an OS image before the memory card 400 is mounted on a mobile device. The host 300 may be a mobile device on which the memory card 400 is mounted by a surface mount technology (SMT). A gang equipment recording an OS image in the memory card 400 is described as the host 300 of the inventive concepts.

The memory card 400 includes a controller 410 and a nonvolatile memory device 420. The card controller 410 is provided with a command CMD, a clock signal CLK, and data from the host 300. When a write operation is performed, the memory card 400 can be provided with a write command and write data synchronized with the clock signal from the host 300. The card controller 410 stores the write data being provided in a target region of the nonvolatile memory device 420.

The controller 410 includes a SMT mode set register 412 for a management of an OS image in accordance with some exemplary embodiments. A write mode of data for preparing for a SMT (or infrared reflow) is input in the SMT mode set register 412. To reduce and/or prevent errors of data which occur when a SMT is performed, the SMT mode set register 412 can be set to a write enable state. In a write enable state of the SMT mode set register 412, the card controller 410 programs data being input by a reliable mode in the nonvolatile memory device 420. However, in a write disable state of the SMT mode set register 412, the card controller 410 deactivates a reliable mode for data being input.

The SMT mode set register 412 is set before data like an OS image is written in the memory card 400. At this time, the host 300 can write a field value of the SMT mode set register 412 using a switching command to activate a reliable mode for an OS image to be programmed in the memory card 400. After a SMT (or infrared reflow) is applied, the host 300 can terminate a reliable mode for an OS image programmed by a reliable mode. The host 300 can write a field value of the SMT mode set register 412 using a switching command.

FIG. 9 is a table illustrating a field value of a SMT mode set register illustrated in FIG. 8. Referring to FIG. 9, a set activating a reliable mode for an OS image of the memory card 400 is stored in the SMT mode set register 412 before programming an OS image. The SMT mode set register 412 is constituted by one (1) byte. Whether a reliable mode for an OS image is activated can be set in a LSB (bit 0) and a MSB (bit 7). It is assumed that each of the LSB (bit 0) and the MSB (bit 7) is set to logic '0' as a default value.

Whether a reliable mode for an OS image is activated can be set in a LSB (bit 0) of the SMT mode set register 412. The host 300 can switch the LSB (bit 0) of the SMT mode set register 412 into logic '1' to write the OS image in the memory card 400 before applying a SMT. The host 300 can use a switching command for writing the LSB (bit 0) of the SMT mode set register 412 as logic '1'. After that, the memory card 400 judges or otherwise determines whether or not to perform a reliable mode for an OS image being input with reference to the LSB (bit 0) of the SMT mode set register 412.

Based on the determination, a reliable mode for an OS image is deactivated can be set in a MSB (bit 7) of the SMT mode set register 412. After a SMT operation is completed, the host 300 can switch the MSB (bit 7) of the SMT mode set register 412 into logic '1'. At this time, the host 300 can use a switching command for writing the MSB (bit 7) of the SMT mode set register 412 as logic '1'. The memory card 400 can deactivate a reliable mode for an OS image with reference to the MSB (bit 7) of the SMT mode set register 412. If a logical value of the MSB (bit 7) of the SMT mode set register 412 is logic '1', the memory card 400 does not apply a reliable mode for the OS image any more.

Figure 10:
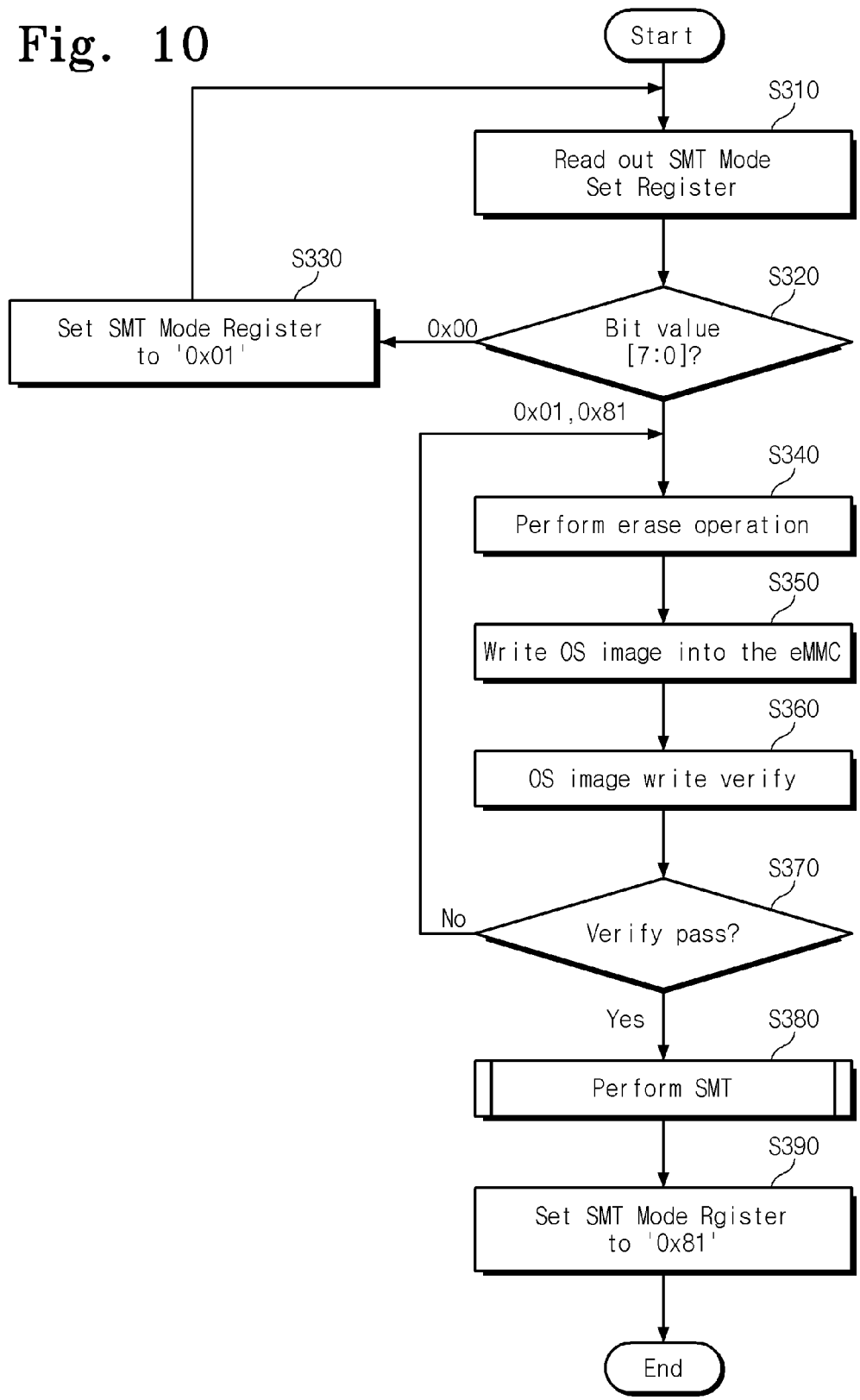
FIG. 10 is a flow chart illustrating an OS image write operation of a host in accordance with an example embodiment of the inventive concepts.

FIG. 10 is a flow chart illustrating an OS image write operation of a host in accordance with an example embodiment of the inventive concepts. Referring to FIG. 10, the host 300 programs an OS image in the memory card 500 before applying a surface mount technology (SMT). The host 300 may be a gang equipment for recording code data or an OS image in the memory card 400 before applying a surface mount technology (SMT). When the memory card 400 in which an OS image will be recorded is connected to the host 300, a write of an OS image of the inventive concepts starts.

In operation S310, the host 300 reads out a field value of the SMT mode set register 412 of the memory card 400. To read out a field value of the SMT mode set register 412 of the memory card 400, the host 300 can provide a register read command for reading a set of the SMT mode set register 412 to the memory card 400. The host 300 checks which is a field value of the SMT mode set register 412 being output in response to the register read command among '0x00', '0x01' and '0x81'.

In operation S320, the host 300 determines a field value of the SMT mode set register. In the case when a field value of the SMT mode set register 412 is '0x00', the host 300 proceeds to operation S330 to set the SMT mode register to an enable state (i.e., '0x01'). In such embodiments, when the field value of the SMT mode set register 412 is '0x00', a MSB and a LSB of the field value of the SMT mode set register 412 are logic '0' which is a default state. Thus, the host 300 proceeds to operation S330 for resetting the field value of the SMT mode set register 412 to a state for writing an OS image. In the case that the field value of the SMT mode set register 412 is set to '0x01' or '0x81', the host 300 proceeds to operation S340 to perform an erase operation. In the case that the field value of the SMT mode set register 412 is set to '0x01' or '0x81', a MSB of the SMT mode set register 412 is logic '0' and a LSB of the SMT mode set register 412 is logic '1'. Thus, an OS image write operation being performed in a state such that a reliable mode is activated should be executed. In the case that the field value of the SMT mode set register 412 is '0x81', a LSB and a MSB of the SMT mode set register 412 are all logic '1'. Thus, in such cases, a reliable mode for an OS image does not need to be applied.

Referring back to operation S320, when a field value of the SMT mode set register 412 is '0x00', the host 300 proceeds to operation S330 to set the SMT mode register to an enable state (i.e., '0x01'). In operation S330, the host 300 sets the field value of the SMT mode set register 412 to '0x01' using a switching command. Once the SMT mode set register 412 is set to '0x01', host 300 returns to operation S310 to read out the SMT mode set register 412.

In operation S340, the host 300 performs an erase operation on a memory area in which an OS image will be stored. The host 300 can ask and/or control the card controller 410 to erase only an area in which an OS image of the memory card 400 will be programmed. The host 300 can ask and/or control the card controller 410 to erase the all area of the memory card 400.

In operation S350, the host 300 provides a write command CMD for an OS image and the OS image to the memory card 400. The host 300 can write an OS image in the memory card 400 through a stream write or a block write command.

In operation S360, the host 300 performs a verification operation on a written OS image. The host 300 judges or otherwise determines whether a write operation is successfully performed or not through error detection for an OS image written in a specific area. In some embodiments, a verification operation may be performed by other verification methods.

In operation S370, the host 300 determines if a result of the verification operation is successful. If the verification result is detected to be a write success of an OS image recorded in the memory card 400 (Yes direction), the host 300 proceeds to operation 380 to perform a surface mount technology (SMT) operation. If the verification result is detected to be a write fail of an OS image recorded in the memory card 400 (No direction), the host 300 returns to operation S340 to erase an existing recorded memory area and then to rerecord an OS image.

In operation S380, a surface mount technology (SMT) is applied to the memory card 400. The memory card 400 goes through a process being built in a main board of a mobile device to be mounted. At this time, in various embodiments, an infrared reflow process can be applied.

In operation S390, as a SMT and/or infrared reflow operation is completed, the host 300 resets a state of the SMT mode set register 412. The host 300 changes the field value of the SMT mode set register 412 to '0x91' by providing a switching command to the memory card 400. The field value of the SMT mode set register 412 being set to '0x81' indicates that an OS image write is completed according to a reliable mode. Thus, after the SMT mode set register 412 is set to '0x81', even if an OS image write request including sector count information occurs, the memory card 400 does not activate a reliable mode.

Figure 11:
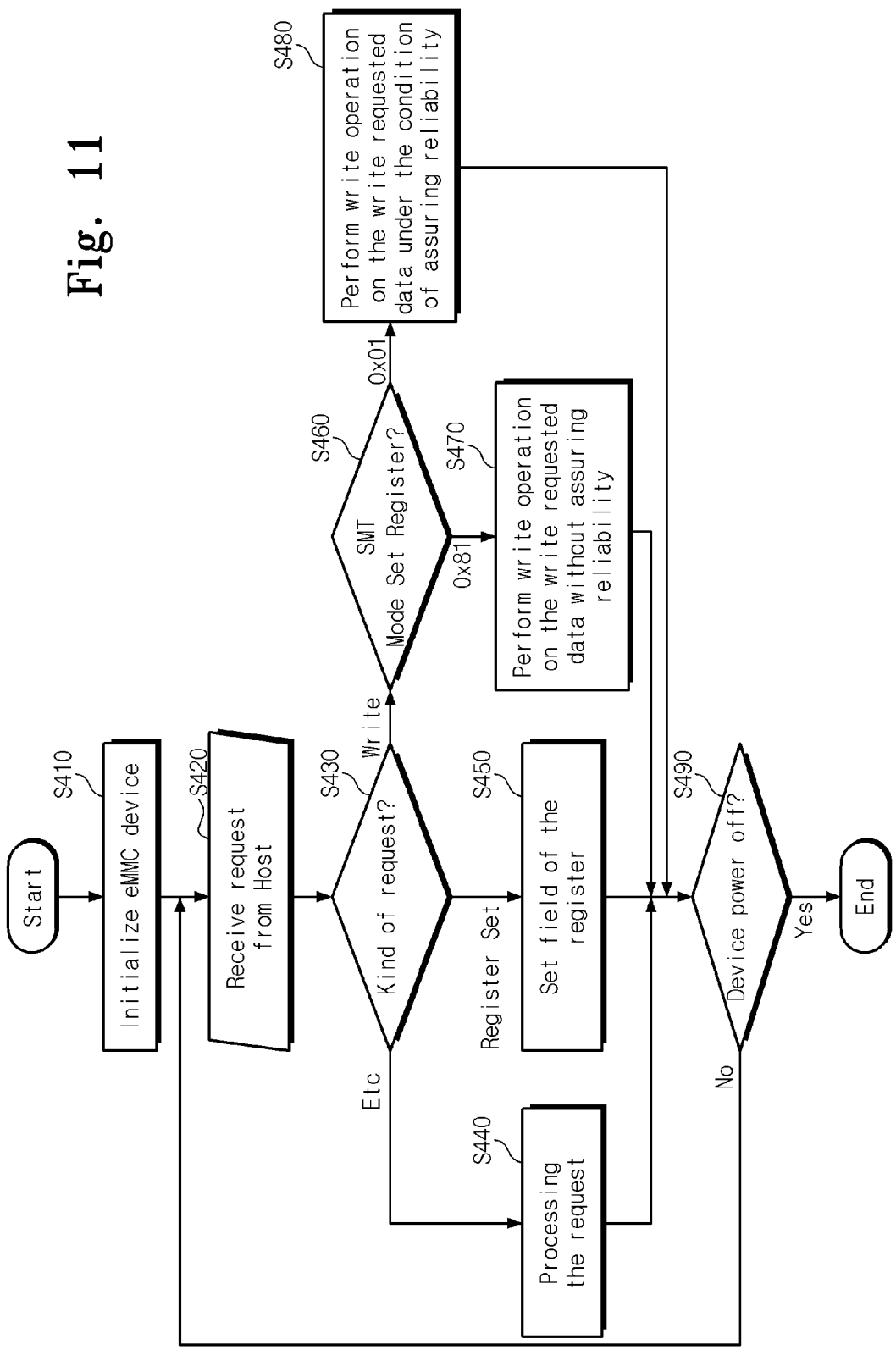
FIG. 11 is a flow chart illustrating an OS image write operation of a memory card in accordance with an example embodiment of the inventive concepts.

FIG. 11 is a flow chart illustrating an OS image write operation of a memory card in accordance with an example embodiment of the inventive concepts. Referring to FIG. 11, the memory card 400 can activate and/or deactivate a reliable mode for an OS image being written with reference to a field value of the SMT mode set register 412.

In operation S410, the memory card 400 performs an initialization operation. Through the initialization operation, the memory card 400 initializes an internal environment for an OS image write, code data, and/or a register setting operation.

In operation S420, the memory card 400 receives requests that are provided from the host 300. In various embodiments, the requests being provided from the host 300 include an OS image write request. Additionally, the requests being provided from the host 300 do not need to be limited an OS image write request. The memory card 400 may accept various access requests being provided from the host 300.

In operation S430, the memory card 400 determines a type of the request being provided from the host 300. If the request being transmitted from the host 300 is not a write request or a register set request (Etc direction), the memory card 400 proceeds to operation S440 to process the request. If the request being transmitted from the host 300 is a register set request (Register set direction), the memory card 400 proceeds to operation S450 to perform a register setting operation. If the request being transmitted from the host 300 is a write request (Write direction), the memory card 400 proceeds to an operation S460 to determine a state of the SMT mode set register.

In operation S440, the memory card 400 performs an operation requested from the host 300. Although receiving OS image information, a request other than an OS image may be provided from the host 300.

In operation S450, the memory card 400 performs a register setting operation according to the request from the host 300. In the case that various switching commands are provided, the memory card 400 records a setting value requested from the host 300 in a corresponding register field. In this case, even if the request is related to an OS image write, the memory card 400 performs a register setting operation within a range requested from the host 300. In some embodiments, the memory card 400 may passively perform the register setting operation within a range requested from the host 300.

In operation S460, the memory card 400 detects and/or determines a field value of the SMT mode set register 412. If the field value of the SMT mode set register 412 is '0x81', the memory card 400 proceeds to operation S470 to perform a write operation on the write requested data without assuring reliability. If the field value of the SMT mode set register 412 is '0x01', the memory card 400 proceeds to an operation S480.

In operation S470, the memory card 400 writes write requested data (an OS image) in the nonvolatile memory device 420 in a state such that a reliable mode is deactivated. The memory card 400 moves write requested data from a buffer memory constituted by SLC cells to a main memory constituted by multi-level cells (MLC) or triple level cells (TLC) at a specific time.

In operation S480, the memory card 400 writes write requested data in the nonvolatile memory device 420 according to a reliable mode. The memory card 400 stores write requested data in a buffer memory constituted by single level cells (SLC) until a SMT operation is finished.

In operation S490, the memory card 400 determines if the device power is in an OFF state. In various embodiments, the memory card 400 detects whether the operation is in an end mode. If an external command or an internal operation state is an end mode or a power cut off mode (Yes direction), the memory card 400 stops all operations. However, in the case that an external command or an internal operation state is not an end mode (No direction), the memory card 400 returns to the operation S420 for monitoring a request being provided from the host 300.

As described above, the memory card 400 can apply a reliable mode of a different level depending on whether a SMT is applied when an OS image write operation is performed.

Figure 12:
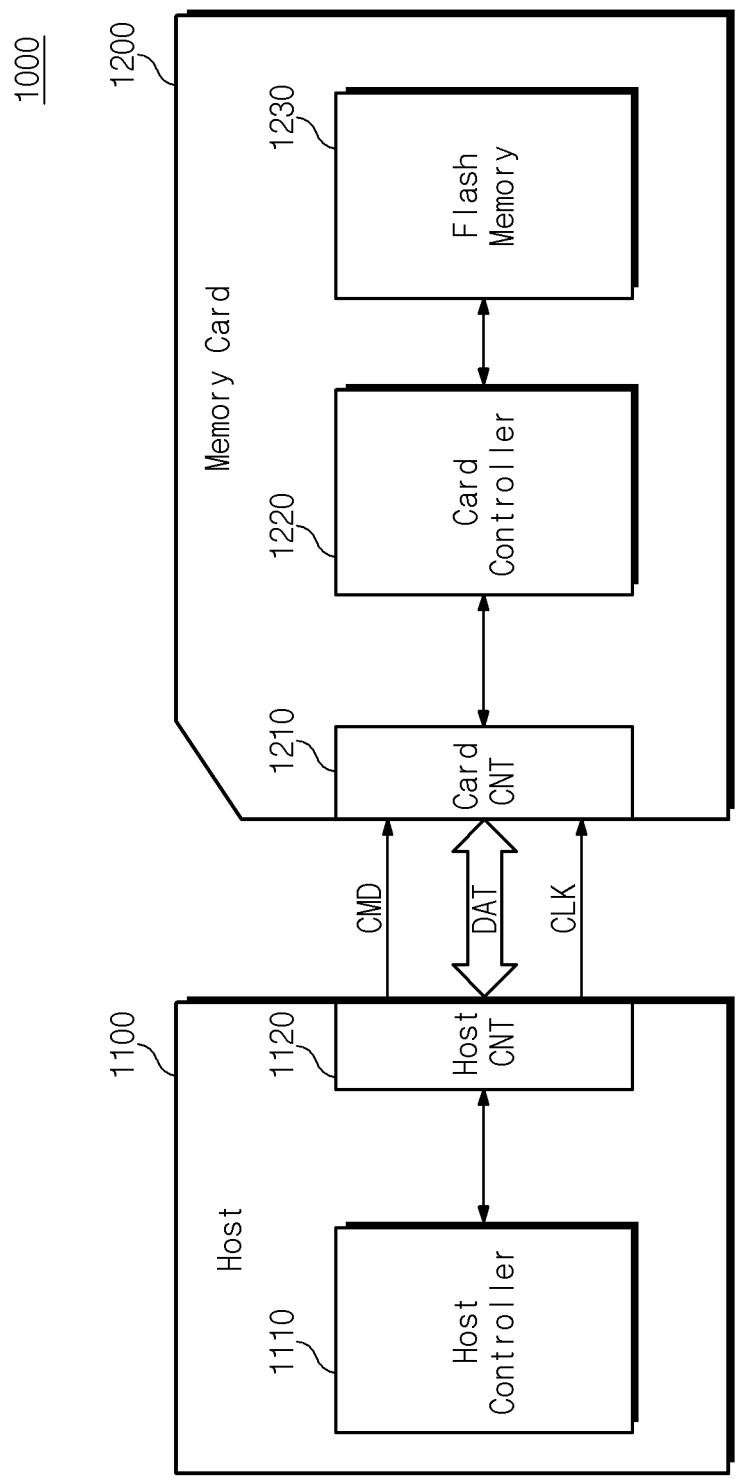
FIG. 12 is a block diagram illustrating a memory card system in accordance with an example embodiment of the inventive concepts.

FIG. 12 is a block diagram illustrating a memory card system in accordance with an example embodiment of the inventive concepts. Referring to FIG. 12, a card system 1000 includes a host 1100 and a memory card 1200. The host 1100 includes a host controller 1110 and a host connection module 1120. The memory card 1200 includes a card connection module 1210, a card controller 1220 and a flash memory 1230.

The host connection module 1120 and the card connection module 1210 are constituted by a plurality of pins. The pin may include a command pin, a data pin, a clock pin, a supply pin, etc. The number of pins depends on the type of the memory card 1200.

The host 1100 writes data in the memory card 1200 or reads data stored in the memory card 1200. The host controller 1110 transmits a command (e.g., a write command), a clock signal CLK generated from a clock generator (not shown) in the host 1100 and data through the host connection module 2120.

In response to a write command received through the card connection module 1210, the card controller 1220 stored data in the memory 1230 in synchronization with a clock signal generated from a clock generator (not shown) in the card controller 1220. In the case that the host 1100 is a digital camera, the card controller 1220 stores image data.

The memory card 1200 can be constituted by an embedded multimedia card (eMMC). Before a mount process such as a surface mount technology (SMT) and/or an infrared reflow is performed on the host 1100, an OS image is stored in an activation state of a reliable mode. Thus, the memory card 1200 has high OS image reliability even after a mount process such as a surface mount technology (SMT) or an infrared reflow is performed and thereby the memory card 1200 greatly contributes to reduction of failure rate.

The card connection module 1210 is configured to communicate with an external device (e.g., a host) through one of various interface protocols such as universal serial bus (USB), memory management controller (MMC), peripheral component interconnect express (PCI-E), small computer system interface (SCSI) serial attached SCSI (SAS), serial advance technology attachment (SATA), parallel advance technology attachment (PATA), enhanced small disk interface (ESDI), and/or integrated drive electronics (IDE) interface.

Figure 13:
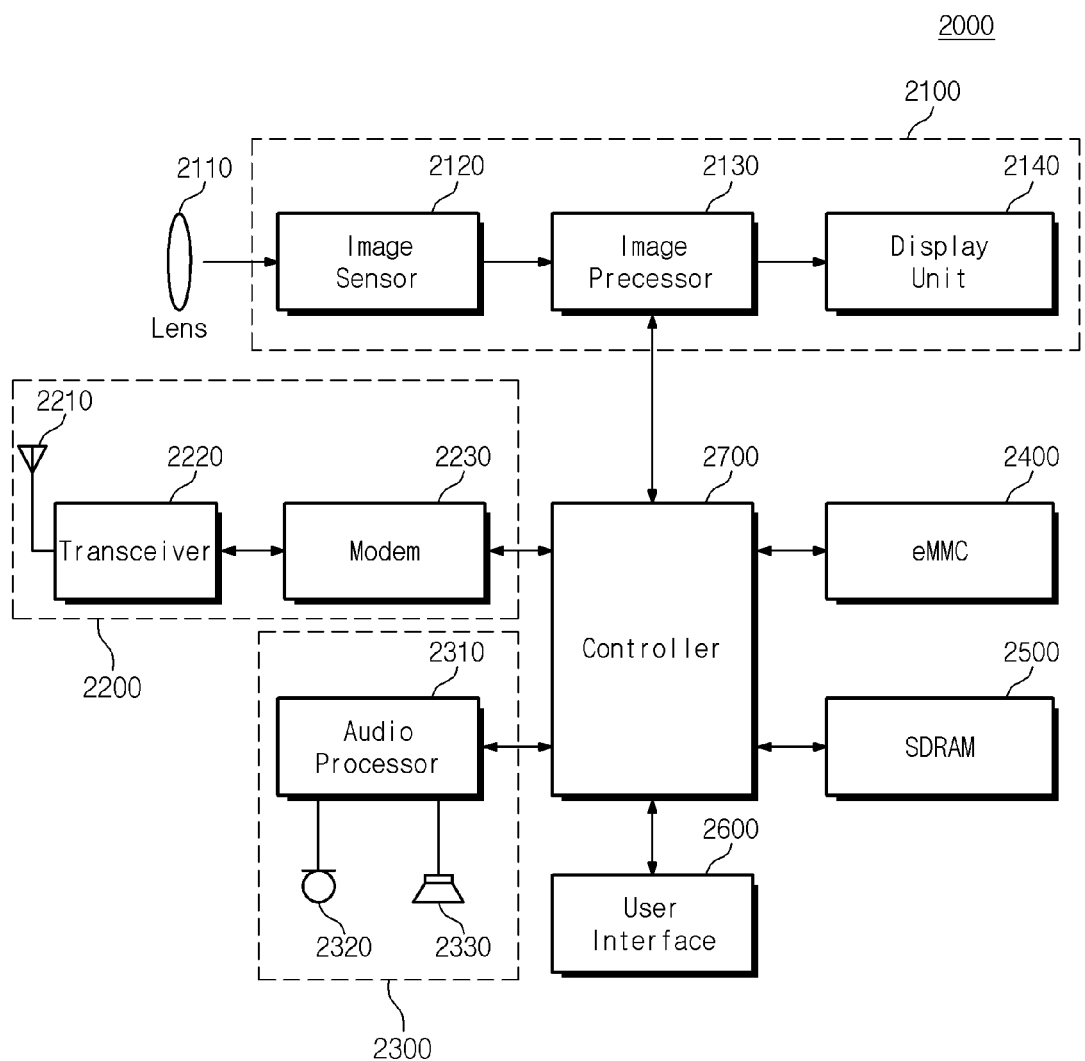
FIG. 13 is a block diagram illustrating a hand-held terminal in accordance with an example embodiment of the inventive concepts.

FIG. 13 is a block diagram illustrating a hand-held terminal in accordance with an example embodiment of the inventive concepts. Referring to FIG. 13, a hand-held terminal 2000 includes an image processing module 2100, a wireless transceiver module 2200, an audio processing module 2300, an embedded multimedia card 2400, a SDRAM 2500, a user interface 2600, and a controller 2700.

The image processing module 2100 includes a lens 2110, an image sensor 2120, an image processor 2130, and a display module 2140. The wireless transceiver module 2200 includes an antenna 2210, a transceiver 2220 and a modem 2230. The audio processing module 2300 includes an audio processor 2310, a microphone 2320, and a speaker 2330.

The embedded multimedia card 2400 may store an OS image or code data. Before a mount process such as a surface mount technology (SMT) and/or an infrared reflow is performed, an OS image is stored in a memory area selected by a reliable mode. Thus, the embedded multimedia card 2400 has high OS image reliability even after a mount process such as a surface mount technology (SMT) or an infrared reflow is performed and thereby the embedded multimedia card 2400 greatly contributes to reduction of failure rate.

The memory card, the nonvolatile memory device and the card controller in accordance with the inventive concepts can be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi-chip package (MCP), wafer-level fabricated package (WFP), and/or wafer-level processed stack package (WSP).

According to example embodiments of the inventive concepts, even after applying a surface mount technology and/or an infrared reflow, an embedded multimedia card capable of guaranteeing reliability of an OS image stored can be embodied.

The foregoing is illustrative of the inventive concepts and is not to be construed as limiting thereof. Although a few embodiments of the inventive concepts have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein

What is claimed is:

1. A method of programming an operating system OS image data in an embedded memory card, the embedded memory card including a first register and a second register, the method comprising:

setting a value in the first register to support a reliable mode;

setting an OS image information to the second register, the OS image information including a size information of the OS image data;

activating the reliable mode in response to receiving the OS image data;

programming the OS image data into a first storage area of the an embedded memory card while the reliable mode is activated; and inactivating the reliable mode after completing the programming the OS image data into the first storage area;

wherein while the reliable mode is activated, a migration of the OS image data from the first storage area to a second storage area is blocked, wherein a number of data bits stored in each memory cell of the first storage area is smaller than a number of data bits stored in each memory cell of the second memory area.

2. The method of claim 1, further comprising:

verifying whether a write operation of writing the OS image data has been successfully performed or not after the programming the OS image data into the first storage area is completed.

3. The method of claim 1, wherein the embedded memory card includes a third register for inactivating the reliable mode.

4. The method of claim 1, further comprising:

mounting the embedded memory card on a mobile device by at least one of a surface mount technology (SMT) and an infrared reflow.

5. The method of claim 4, wherein the inactivating the reliable mode is performed before the mounting the embedded memory card on a mobile device.

6. The method of claim 4, wherein the inactivating the reliable mode is performed after the mounting the embedded memory card on a mobile device.

7. A method of programming an operating system (OS) image of an nonvolatile storage device using a host device, the method comprising:

checking, by the host device, whether the nonvolatile storage device supports a reliable mode for the programming of the OS image;

if the nonvolatile storage device supports the reliable mode, interfacing a size information for the OS image between the nonvolatile storage device and the host device;

activating the reliable mode by setting a register in the nonvolatile storage device;

sending data for the OS image from the host to the nonvolatile storage device;

programming the data for the OS image into a first storage area of the nonvolatile storage device while the reliable mode is activated; and inactivating the reliable mode after completing the programming the data for the OS image into the first storage area, wherein while the reliable mode is activated, the data for OS image is programmed into the first storage area having a first reliability, and migration of the data from the first storage area to a second storage area having a second reliability lower than the first reliability is blocked.

8. The method of 7, further comprising:

mounting the nonvolatile storage device on a target board by a surface mount technology (SMT) or an infrared reflow after or before inactivating the reliable mode.

9. The method of claim 7, wherein the inactivating the reliable mode is performed by way of setting register of the nonvolatile storage device by the host.

* * * * *